US006823628B2

(12) United States Patent
Morrison et al.

(10) Patent No.: US 6,823,628 B2
(45) Date of Patent: Nov. 30, 2004

(54) MODULAR VEHICLE DOOR ASSEMBLY

(75) Inventors: Gerald O. Morrison, Beverly Hills, MI (US); Lewis B. Duff, Rochester Hills, MI (US); Iris Drew, Berkley, MI (US); James F. Ventimiglia, Macomb Township, MI (US); Eric Hoisington, Eastpointe, MI (US)

(73) Assignee: Lear Corporation, Southfield, MI (US)

( * ) Notice: Subject to any disclaimer, the term of this patent is extended or adjusted under 35 U.S.C. 154(b) by 3 days.

(21) Appl. No.: 10/319,960

(22) Filed: Dec. 16, 2002

(65) Prior Publication Data

US 2003/0096510 A1 May 22, 2003

Related U.S. Application Data

(62) Division of application No. 09/732,698, filed on Dec. 8, 2000, now Pat. No. 6,493,919.
(60) Provisional application No. 60/169,865, filed on Dec. 9, 1999.

(51) Int. Cl.$^7$ ................................................. B60J 5/04
(52) U.S. Cl. ............................................ 49/502; 49/348
(58) Field of Search ........................... 49/502, 348, 349, 49/352, 374

(56) References Cited

U.S. PATENT DOCUMENTS

| 4,606,148 | A |   | 8/1986  | Gandini |
| 4,766,697 | A |   | 8/1988  | Boileau |
| 4,785,585 | A |   | 11/1988 | Grier et al. |
| 4,829,713 | A |   | 5/1989  | Bozyk et al. |
| 4,890,376 | A |   | 1/1990  | Boileau |
| 4,924,630 | A |   | 5/1990  | Lomasney et al. |
| 5,050,350 | A | * | 9/1991  | Bertolini et al. ............. 49/502 |
| 5,095,659 | A | * | 3/1992  | Benoit et al. ................ 49/502 |
| 5,121,534 | A |   | 6/1992  | Kruzich |
| 5,355,629 | A |   | 10/1994 | Kimura et al. |
| 5,379,553 | A |   | 1/1995  | Kimura et al. |
| 5,505,024 | A |   | 4/1996  | DeRees et al. |
| 5,829,123 | A |   | 11/1998 | Shashlo et al. |
| 5,878,532 | A |   | 3/1999  | Kavanagh et al. |
| 5,904,002 | A |   | 5/1999  | Emerling et al. |
| 5,927,020 | A | * | 7/1999  | Kobrehel ..................... 49/502 |
| 5,927,021 | A |   | 7/1999  | Kowalski et al. |
| 5,931,682 | A | * | 8/1999  | Takiguchi et al. ........... 439/34 |
| 6,000,959 | A |   | 12/1999 | Curtindale et al. |
| 6,061,890 | A |   | 5/2000  | Shashlo et al. |
| 6,076,882 | A | * | 6/2000  | Szerdahelyi et al. ..... 296/146.1 |
| 6,101,765 | A |   | 8/2000  | Hashimoto et al. |
| 6,139,088 | A |   | 10/2000 | Okamoto et al. |
| 6,176,542 | B1 |  | 1/2001  | Gooding et al. |
| 6,185,872 | B1 | * | 2/2001 | Seeberger et al. ........... 49/502 |
| 6,185,874 | B1 | * | 2/2001 | Barrero Serrano et al. ... 49/502 |
| 6,192,632 | B1 | * | 2/2001 | Medebach et al. ........... 49/502 |
| 6,205,714 | B1 | * | 3/2001 | Staser et al. ................. 49/502 |
| 6,233,875 | B1 | * | 5/2001 | Carlo et al. .................. 49/502 |
| 6,438,899 | B1 | * | 8/2002 | Feder et al. .................. 49/502 |
| 6,510,657 | B1 | * | 1/2003 | Bertolini et al. ............. 49/502 |
| 6,536,164 | B1 | * | 3/2003 | Kirejczyk .................... 49/502 |
| 6,594,955 | B1 | * | 7/2003 | Delire et al. ................. 49/502 |

* cited by examiner

Primary Examiner—Gregory J. Strimbu
(74) Attorney, Agent, or Firm—Bill C. Panagos

(57) ABSTRACT

A modular door assembly having a door frame and a carrier secured to the door frame. A door entry system is secured to the carrier to operate the vehicle door. A window carrier assembly includes a window regulator and motor secured to the carrier. A window pane is attached to the window regulator and is adjustable relative to the carrier in the vehicle door frame.

14 Claims, 14 Drawing Sheets

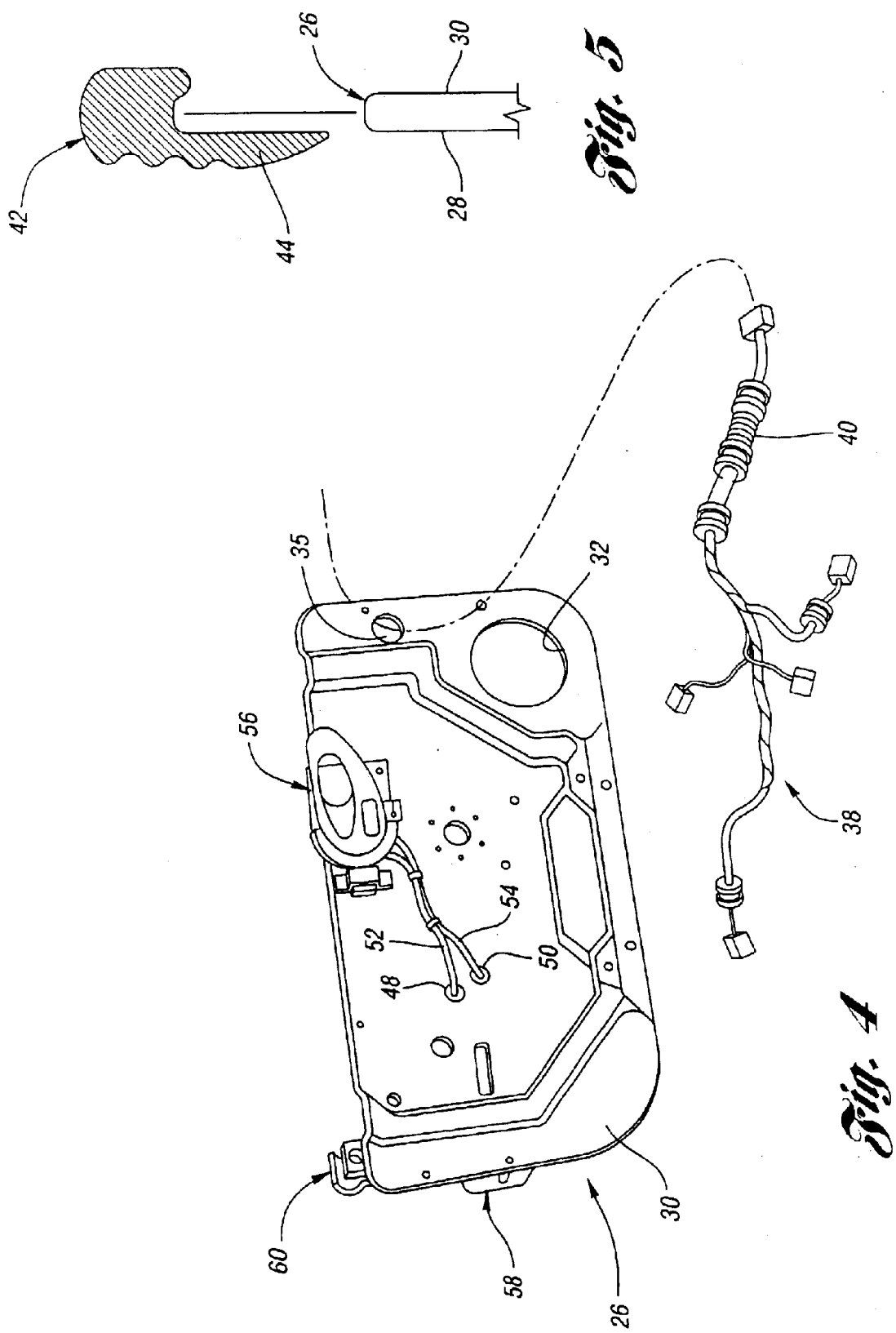

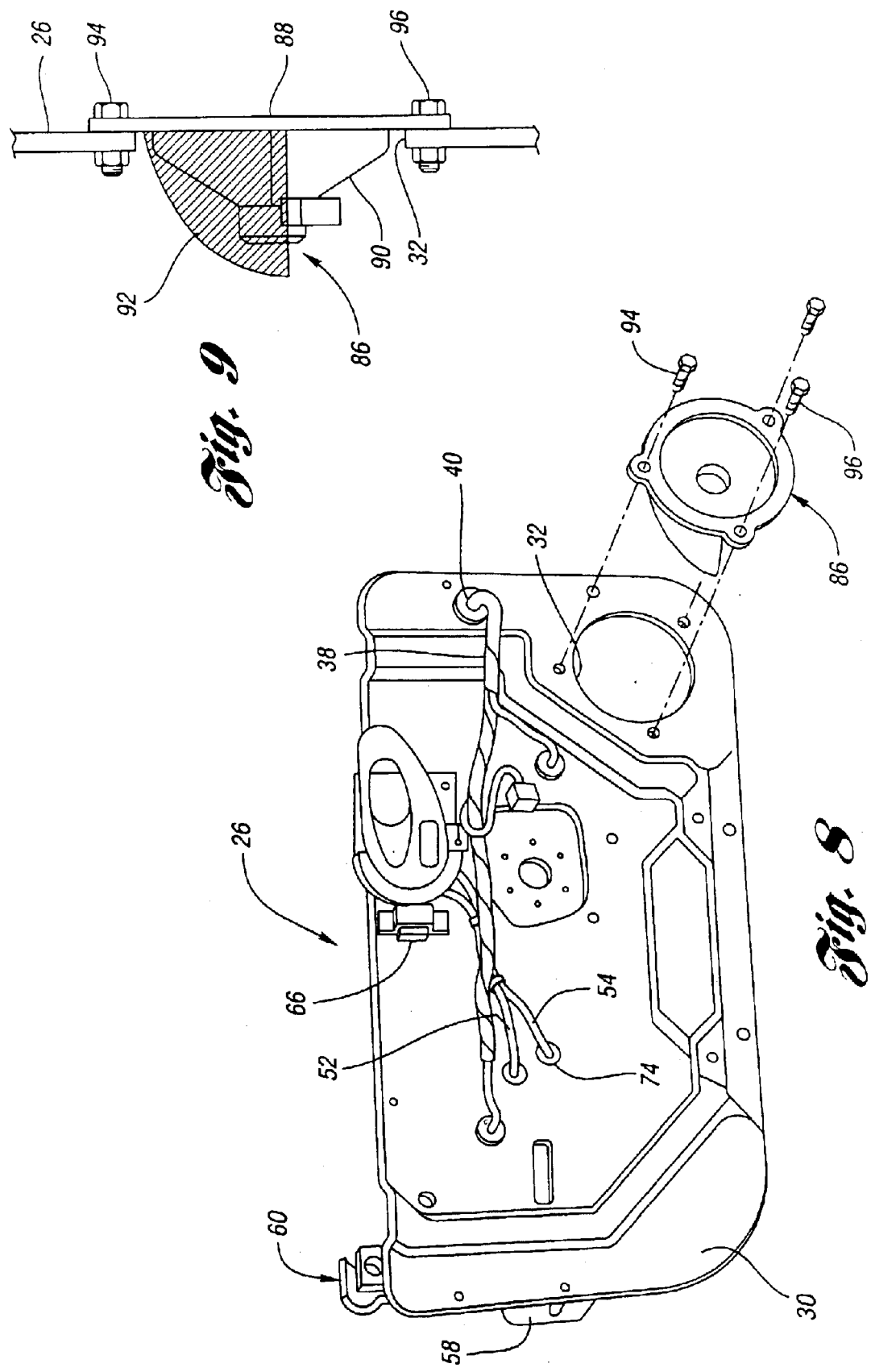

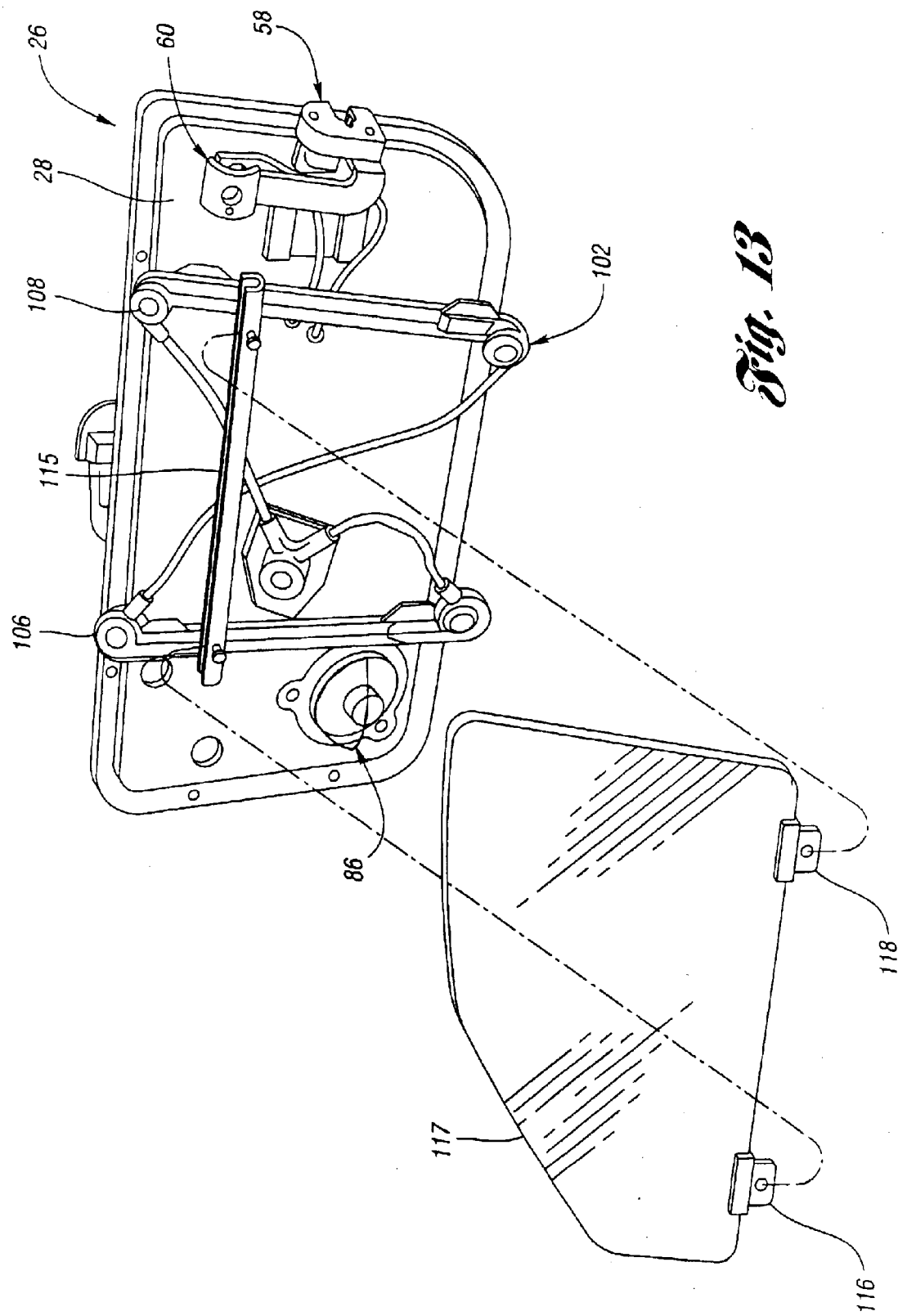

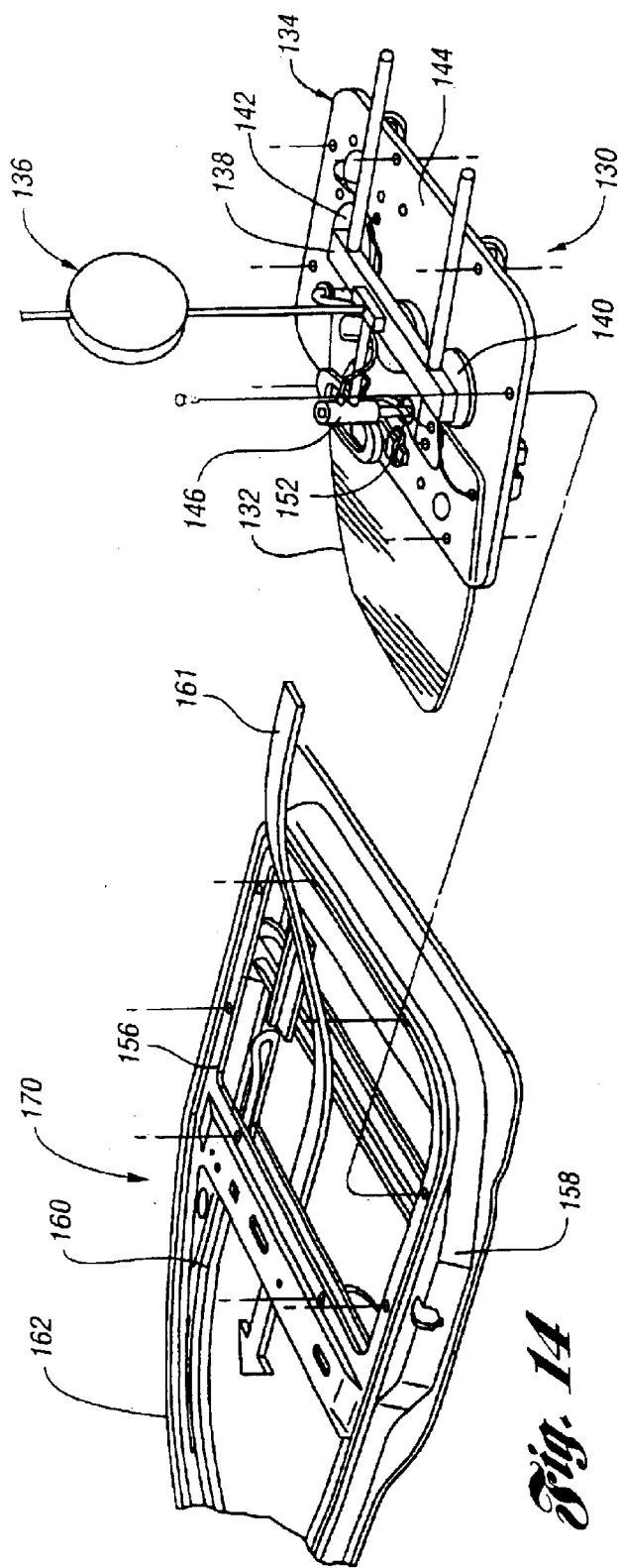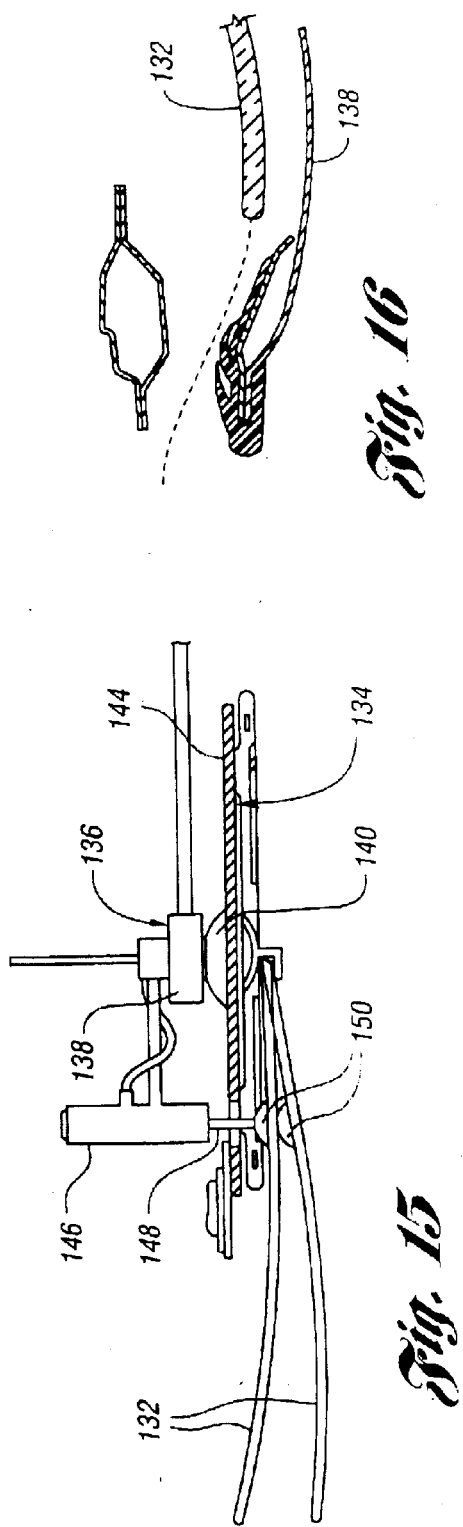

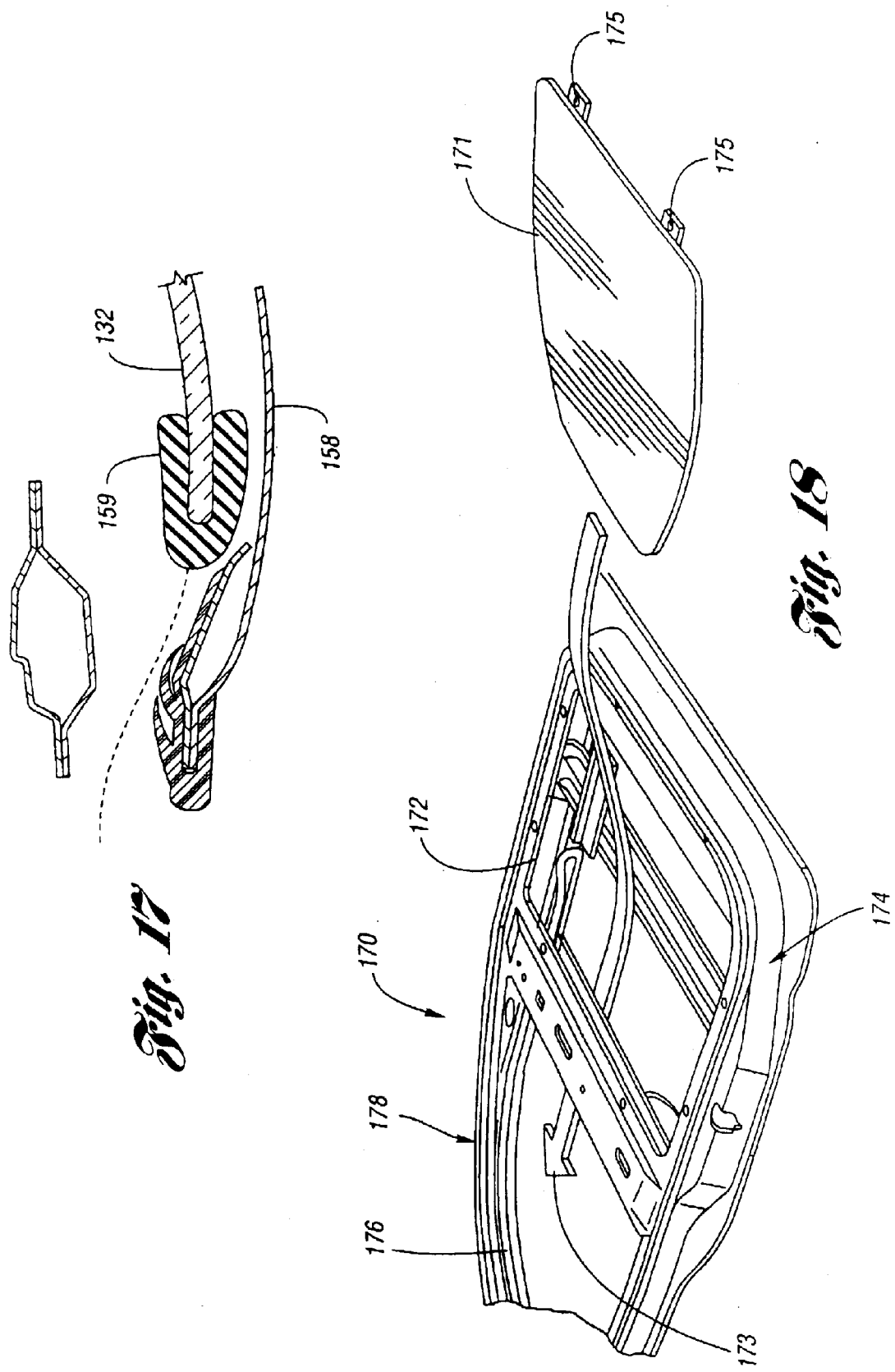

MODULAR VEHICLE DOOR ASSEMBLY

CROSS-REFERENCE TO RELATED APPLICATIONS

This is a divisional of application(s) Ser. No. 09/732,698 filed on Dec. 8, 2000, now U.S. Pat. No. 6,493,919 which claims the benefit of provisional application Ser. No. 60/169,865 filed Dec. 9, 1999.

BACKGROUND OF THE INVENTION

1. Field of the Invention

This invention relates to vehicle door assemblies, and more particularly to a modular door assembly for a vehicle and a method of assembling a modular vehicle door.

2. Background Art

Doors for automotive vehicles generally include a metal door frame having inner and outer door frame panels which is attached to the body of a vehicle. A reinforcement panel or member may be attached to the inner door panel to provide additional structural support for the door frame and to receive and support various hardware components on the reinforcement panel. Conventionally, hardware components such as a handle assembly, window regulator and motor assembly, and electrical components such as interior lights and speakers, are secured to the reinforcement panel concurrently with assembly of the vehicle door. Alternatively, the hardware components of the vehicle door may be assembled to the reinforcement panel as a subassembly prior to assembling the reinforcement panel to the inner and outer vehicle door panel.

Conventional vehicle doors are assembled with the vehicle door panel positioned vertically, and then mounting carrier and other window components to the vehicle door panel. The window pane is inserted like a cassette into the window carrier component for final assembly. A common problem associated with these methods of assembly is that the components of the vehicle doors are assembled to the door frame while the frame is vertically mounted on the frame of the vehicle. This becomes problematic in supporting and securing a pane of window glass to be inserted in the door frame.

One method of assembly requires an assembly line worker to manually support the window pane in a vertical position in the vehicle door frame prior to attachment of the reinforcement panel and hardware components to the door frame. This requires the assembly line worker to enter the vehicle to assemble the door panel, which slows the time of assembly of the vehicle and creates significant ergonomic problems for the assembly line worker.

An alternative method of assembling a window pane in the door panel requires the use of large assembly equipment to support and secure the window pane in the door frame while the assembly line worker mounts the reinforcement panel and hardware components to the vehicle door frame. This method significantly increases the cost of assembling the vehicle door panel. Additionally, assembly line workers are unable to completely test all hardware components of the door panel prior to completion of the assembly to insure that no mechanical or electrical problems exist prior to the release of the vehicle.

It is desirable to provide a modular door assembly for a vehicle which reduces the number of components necessary to complete the door assembly. It is also desirable to provide a method of manufacturing a vehicle door assembly which decreases the overall cost of manufacturing, reduces assembly time and allows for a full diagnostic check of all hardware components of the door panel assembly prior to release of the vehicle.

SUMMARY OF THE INVENTION

Therefore, it is an object of the invention is to provide a modular door assembly for a vehicle including a modular support structure or carrier having a plurality of components thereon to be installed as a unit on a vehicle door frame.

Another object of the invention is to provide a method of manufacturing and assembling a modular door for a vehicle wherein a window pane mounted to the carrier is assembled with the carrier to the door frame.

Yet another object of the invention is to provide a method of manufacturing and assembling a modular door for a vehicle wherein a window pane is provided in the door frame to be assembled to carrier secured to the door frame.

A further object of the present invention is to provide a modular door assembly for a vehicle which reduces the overall cost of manufacturing and assembling the modular door assembly.

The present invention overcomes the above referenced problems associated with prior vehicle door systems by providing a modular door assembly for a vehicle comprising a vehicle door frame having an inner surface and an outer surface. A carrier having an elongate body is secured to the inner surface of the vehicle door frame to provide structural support to the vehicle door frame.

A door entry system including a lock assembly, a latch assembly in communication with the lock assembly, an outer handle disposed in the outer surface of the vehicle door frame connected to the lock assembly and an inner handle mounted to the carrier in communication with the latch assembly is mounted to the carrier. Inner handle and latch assembly are interconnected by at least one cable extending through an aperture formed in the carrier. In one embodiment of the invention, the at least one cable is a quick-connect cable having a first end attached to the inside door handle and a second end attached to the latch assembly. A grommet extends about the outer periphery of the at least one cable to seal the aperture in the elongate body of the carrier.

A window carrier assembly mounted to the elongate body. The window carrier assembly includes a window regulator secured to the carrier having a pair of spaced apart vertical rails, a generally horizontal support arm extending between the rails and a motor in communication with the support arm to adjust the position of the support arm on the spaced apart rails. A window pane is secured to the support arm of the window regulator and is vertically adjustable relative to the elongate body of the carrier.

A seal extends about the outer periphery of the elongate body of the carrier between the door frame and the carrier to inhibit the introduction of foreign materials into a passenger compartment of the vehicle. Vehicle components, such as speakers and switches which operatively control the window carrier assembly are mounted to the carrier. A wiring harness assembly extends through an aperture in the elongate body of the carrier to connect the motor of window carrier assembly and the vehicle components to an electrical system of the vehicle.

A first method of assembling a modular vehicle door is disclosed, wherein the outer surface of the vehicle door frame is placed on a substantially horizontal planar surface. A window pane is secured to the control arm of the window regulator of the window carrier assembly mounted to the along with the door entry system. A loading device is used to engage and secure the carrier and window pane. A first arm of the loading device includes suction cups which secure the carrier module. A second adjustable arm extends through an aperture in the carrier to engage the window pane. The loading device includes a lifting mechanism extending vertically from the first arm to support the carrier. Adjustment arms extend away from the receiving arm to position the loading device.

The loading device is used to position the carrier and window pane into position above the door frame. The window pane is inserted into a cavity in the inner surface of the door frame and is positioned into a channel formed in the door frame. The second arm may be adjusted to help align the window pane in the channel in the door frame. In one embodiment of the invention, a window assembly tool is placed about the outer periphery of an upper surface of a window pane to protect the window pane when inserted into the cavity in the door frame. Once the window pane is aligned in the door frame, the carrier is secured to the inner surface of the door frame to complete assembly of the modular vehicle door. The door may then be assembled to the frame of the vehicle.

A second method of assembling a modular vehicle door is disclosed, wherein the a window pane is inserted through a cavity in the inner surface of the door frame into a channel in the door frame. A loading device including a receiving arm having suction cups at each end of the receiving arm engages an inner surface of the carrier. The loading device further includes a lifting mechanism extending vertically from the receiving arm to support the carrier and planar adjustment arms extending away from the receiving arm to position the loading device. The carrier is positioned above and mounted to the inner surface of the door frame. The window pane is secured to the support arm of the window carrier assembly prior to securing the carrier to the inner surface of the door frame.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 4 is an exploded perspective view of a wiring harness assembly and carrier of the present invention FIG. 5 is a sectional view of the water seat mounted about the outer periphery of the carrier;

FIG. 8 is an exploded perspective view of the carrier including a speaker assembly;

FIG. 9 is a side view of the speaker assembly mounted to the carrier;

FIG. 13 is an exploded perspective view of a window pane and window carrier assembly of the present invention;

FIG. 14 is an exploded perspective view of a first method of assembling a modular door assembly of the present invention;

FIG. 15 is a plan view of a lifting and loading device in accordance with the first embodiment of the present invention;

FIG. 16 is an exploded plan view of the window pane and door frame in conjunction with the first method of assembly of the present invention;

FIG. 17 is an exploded plan view of an assembly tool used in conjunction with the first method of assembling a modular vehicle door of the present invention;

FIG. 18 is an exploded perspective view of a window pane and door frame in conjunction with a second method of assembling a modular door for a vehicle of the present invention;

DETAILED DESCRIPTION OF THE PREFERRED EMBODIMENT(S)

Figure 1:
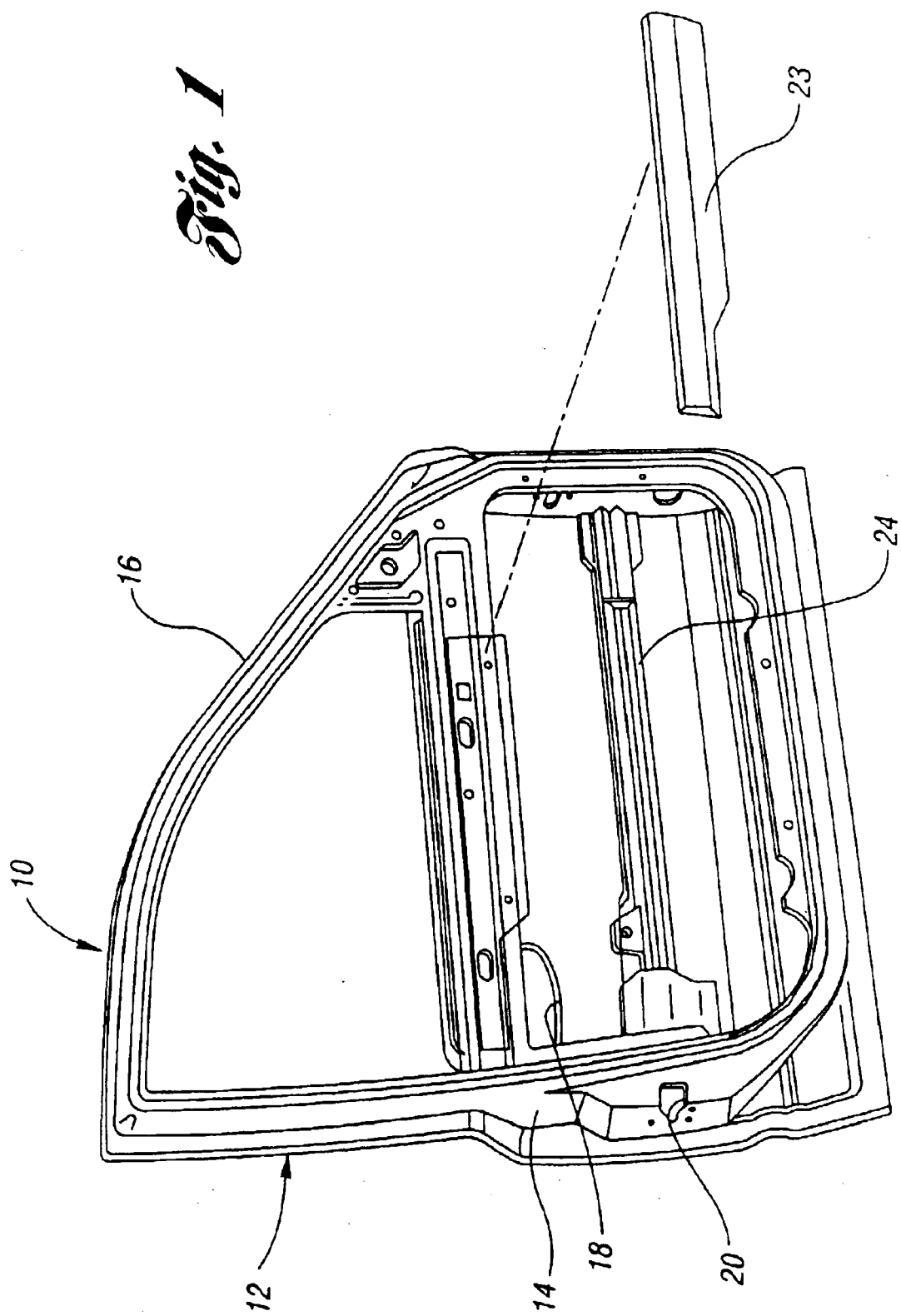
FIG. 1 is a perspective view of a vehicle door frame of the modular door assembly of the present invention for the left hand side of a motor vehicle.

Referring to FIG. 1, a modular vehicle door assembly of the present invention includes a vehicle door frame 10 having an outer door panel 12 and an inner door panel 14. Inner and outer door panels 12, 14 are generally vertical panels formed of a stamped sheet metal which are joined to form vehicle door frame 10. Alternatively, vehicle door frame 10 may be formed as a one piece structure. The vehicle door frame 10 includes a header section 16, and a hole in the outer door panel to receive a handle 18. An aperture 20 is provided adjacent a rear portion of the vehicle door frame 10 on the inner door panel 14. The aperture 20 corresponds to a latch assembly mounted to a structural module or carrier 26. A reinforcement member 24 is mounted between a front and rear section of the inner door panel 14 to provide structural support for the vehicle door frame 10.

Figure 2:
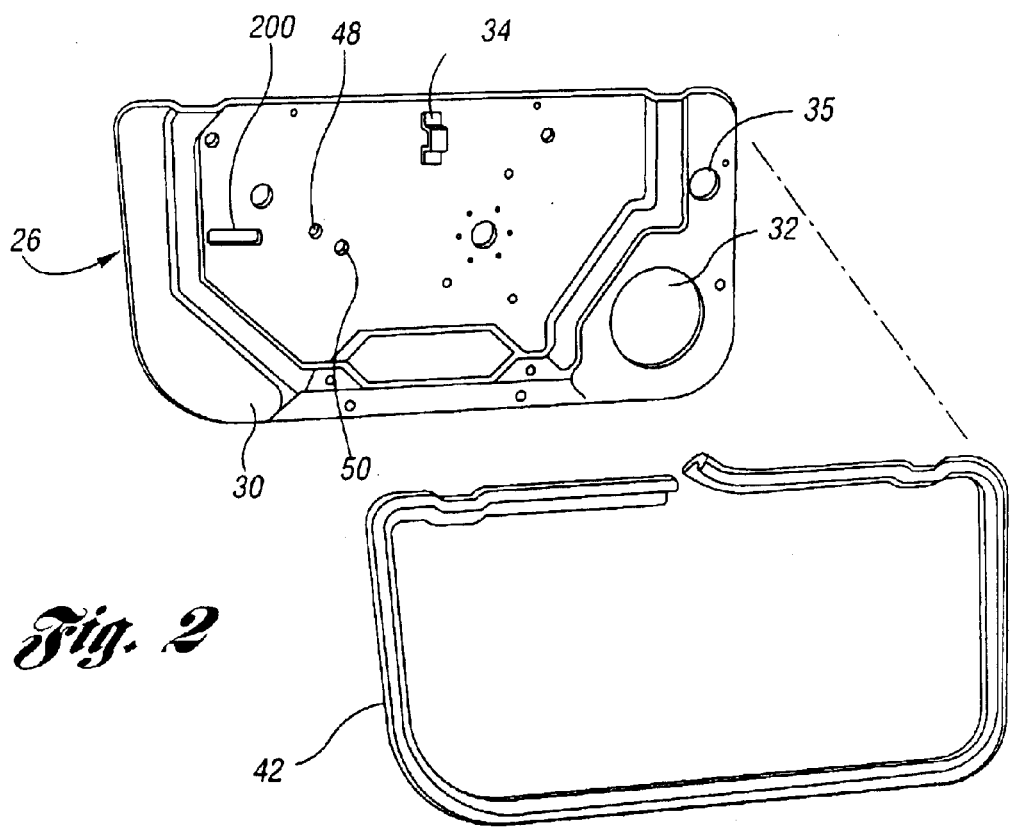
FIG. 2 is an exploded perspective view of an inner side of a structural support module or carrier and wet seal of the present invention.

Referring now to FIGS. 2, 4 and 5, structural support module or carrier 26 is an elongate body having an outer or wet side surface 28 and an inner or dry side surface 30. Carrier 26 is mounted tho the vehicle door frame 10 adjacent inner door panel 14. In a preferred embodiment of the invention, carrier 26 is a one-piece metal stamped structure. However, it is understood that carrier 26 may also be molded as a one-piece structure from a polymeric material or may be formed as a two-piece structure of various materials joined about common edges. As shown in FIG. 8, an aperture 32 in carrier 26 receives a speaker assembly 86 and switches 85 are mounted on the carrier. A bracket 34 is mounted on the inner side 30 of carrier 26 to receive and secure an inner handle 56 of a door entry system, which is generally referred to by reference numeral 36. At least one hole 35 is formed in carrier 26 adjacent a front portion of the carrier 26 to receive a wiring harness assembly 38.

The wiring harness assembly 38 connects electrical components, such as door locking mechanisms, automatic window regulator switches, lights and motor assemblies for the window regulator, to the electrical system of the vehicle. The wiring harness assembly includes a series of grommets 40 provided on the outer periphery of the wiring harness assembly to provide a seal for each hole 35 in the carrier 26 to ensure that water or debris does not pass from the wet side 28 to the dry side 30 of the carrier 26.

Figure 3:
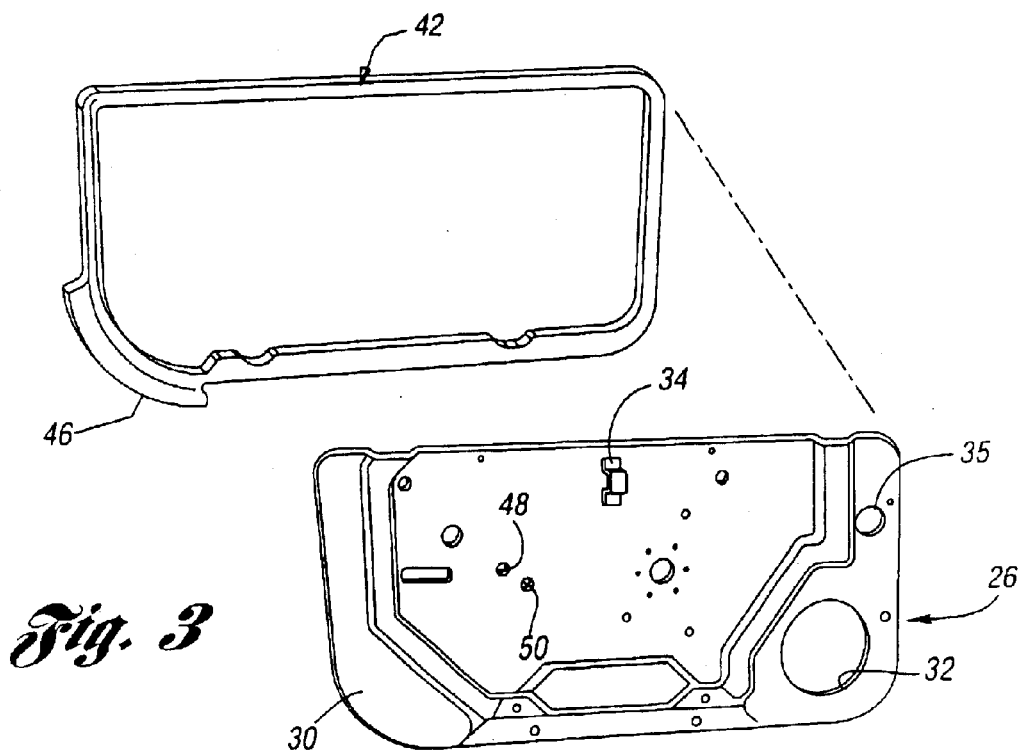
FIG. 3 is an exploded perspective view showing an alternative water seal in conjunction with the carrier of the present invention.

Referring now to FIGS. 2, 3 and 5, a water seal 42 is provided about the outer periphery of carrier 26. As shown in FIG. 5, water seal 42 includes a lip portion 44 extending around to the wet side surface 28 of carrier 26. In an alternative embodiment of the water seal 42 shown in FIG. 3, water seal 42 includes a flap 46. When the water seal is mounted around the outer periphery of the carrier 26, flap 46 wraps around a lower surface of the carrier 26 and is attached to the dry side of carrier 26. The flap ensures a proper seal between the carrier 26 and the vehicle door frame 10 to inhibit the introduction of foreign materials into the passenger compartment of the vehicle.

Referring now to FIG. 4, carrier 26 includes a pair of apertures 48, 50 extending through the carrier 26. Apertures 48, 50 receive a pair of cables 52, 54 which connect the door entry system 36 to latch assembly 58 and lock assembly 60. In an alternative embodiment of the invention, a single aperture is provided in the carrier 26 which receives a cable connection assembly. Connection assembly is mounted in the aperture in carrier 26 to receive and secure cables 52, 54 of door entry system 36.

Figure 6:
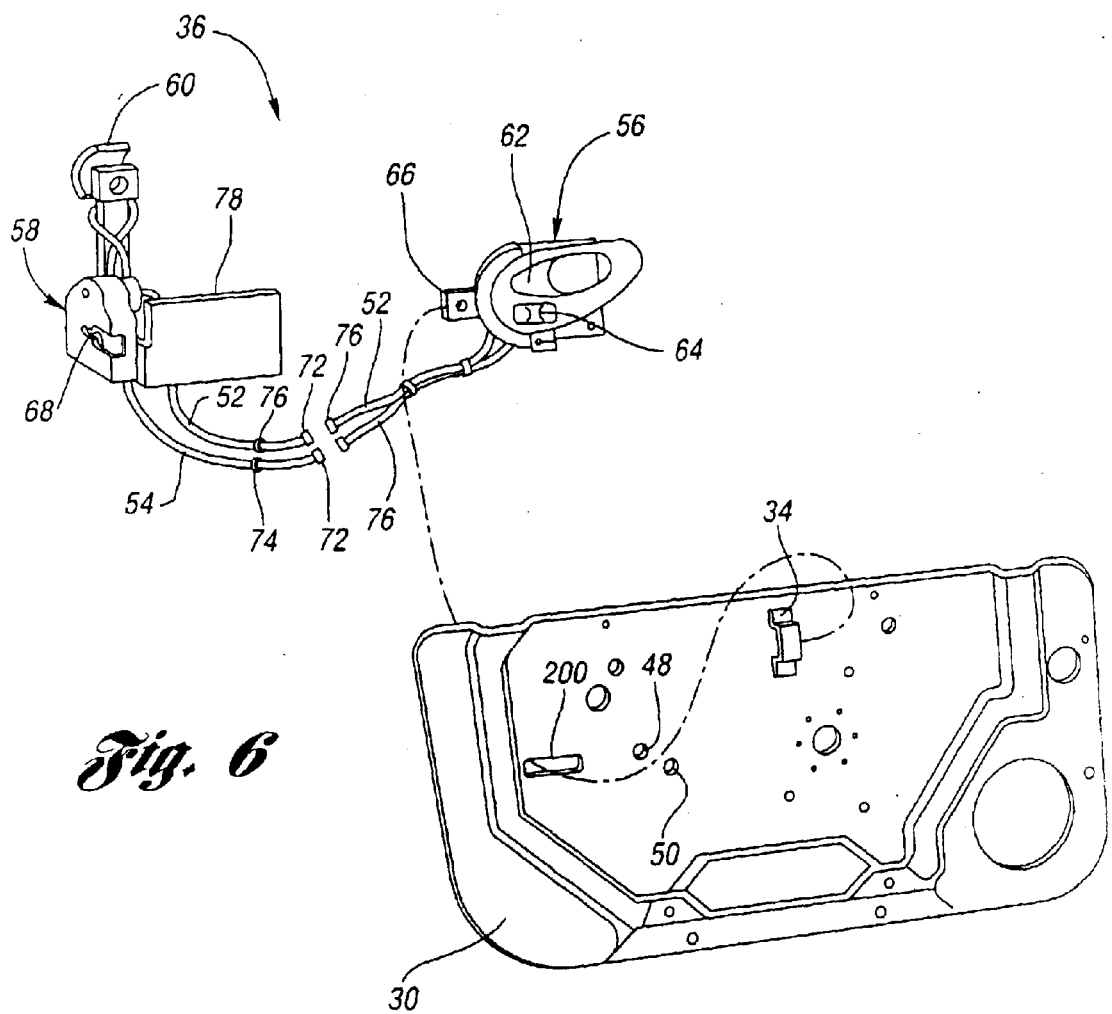
FIG. 6 is an exploded perspective view of the door entry system, including an inner door handle, lock assembly and latch assembly in conjunction with the carrier of the present invention.

Door entry system 36 includes an inside door handle 56, a latch assembly 58, a lock assembly 60 coupled to and extending from latch assembly 58 and an outer door handle 212. Cables 52 and 54 interconnect inside door handle 56, latch assembly 58 and lock assembly 60 to operatively lock and unlock the lock the door entry system 36. Inside door handle 56 of door entry system 36 includes a handle portion 62, a locking switch 64 and a mounting bracket 66. As seen in FIG. 6, mounting bracket 66 slides into bracket 34 mounted on the inner side 30 of carrier 26 to secure the inside door handle 56 to carrier 26.

Figure 7:
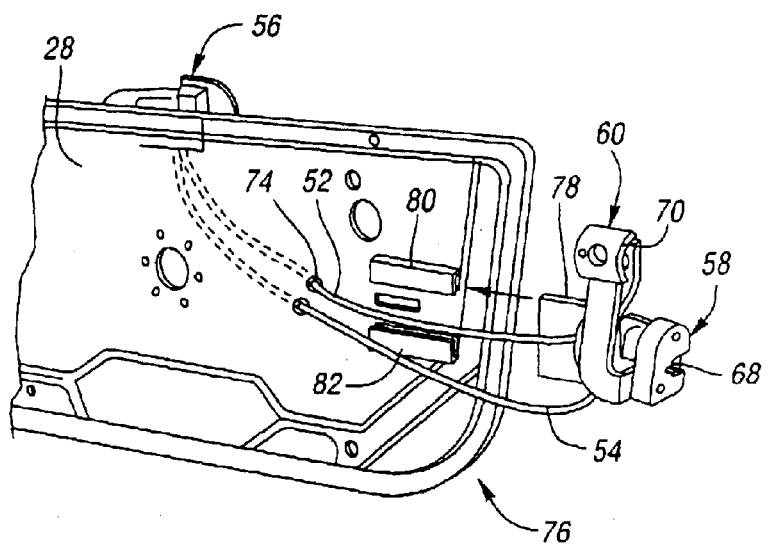
FIG. 7 is a perspective view of the carrier and door entry system of the present invention.
Figure 10:
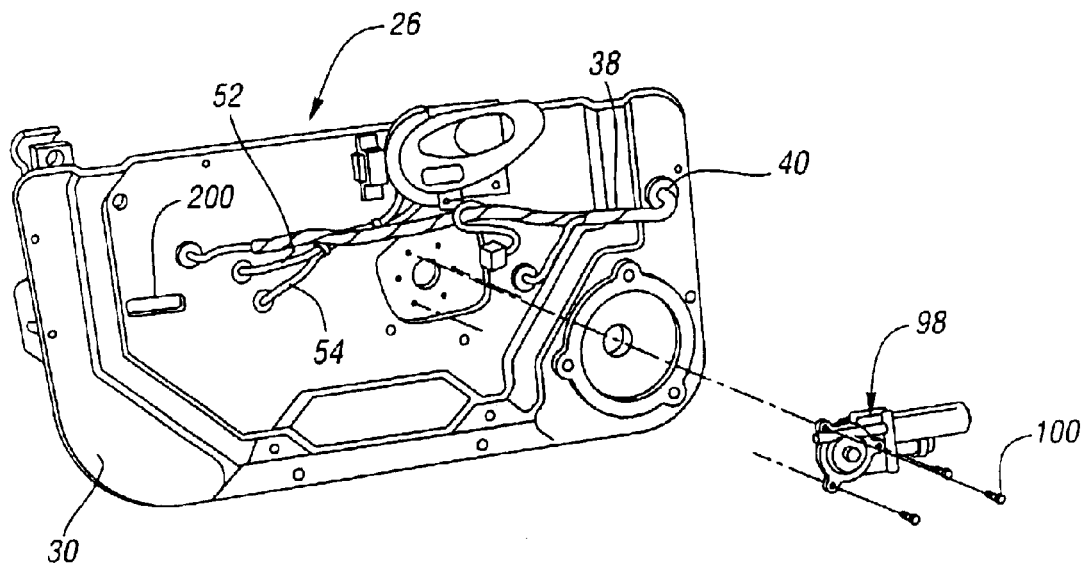
FIG. 10 is an exploded perspective view of a carrier and a motor of a window carrier assembly.
Figure 12:
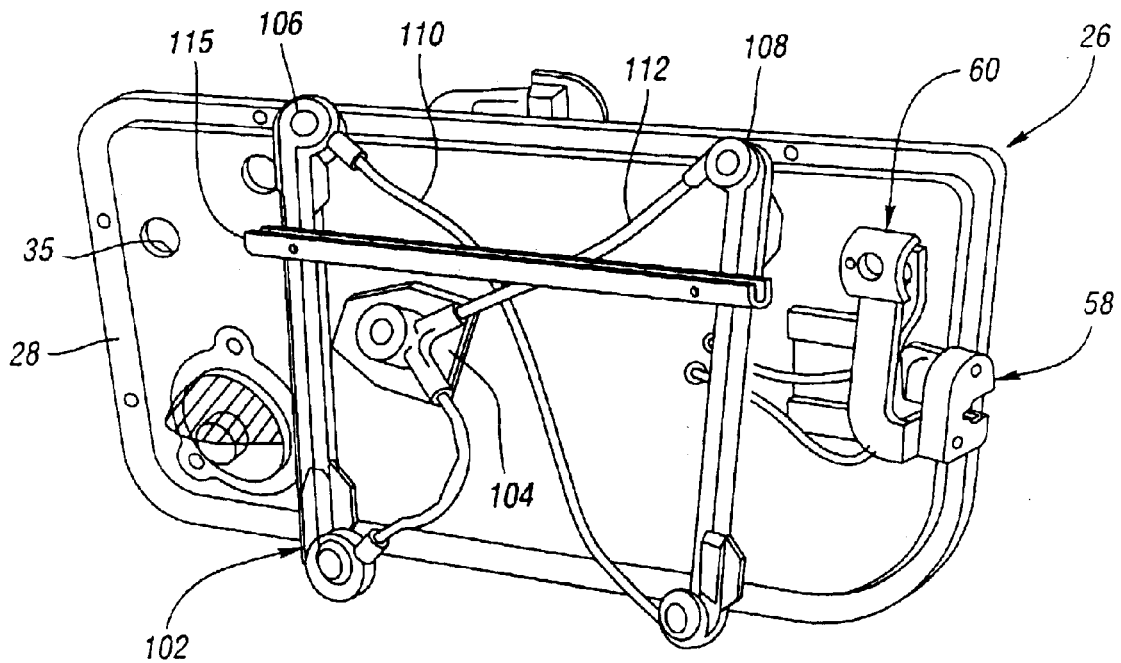
FIG. 12 is a perspective view of the window carrier assembly mounted to the outer side of the carrier.
Figure 11:
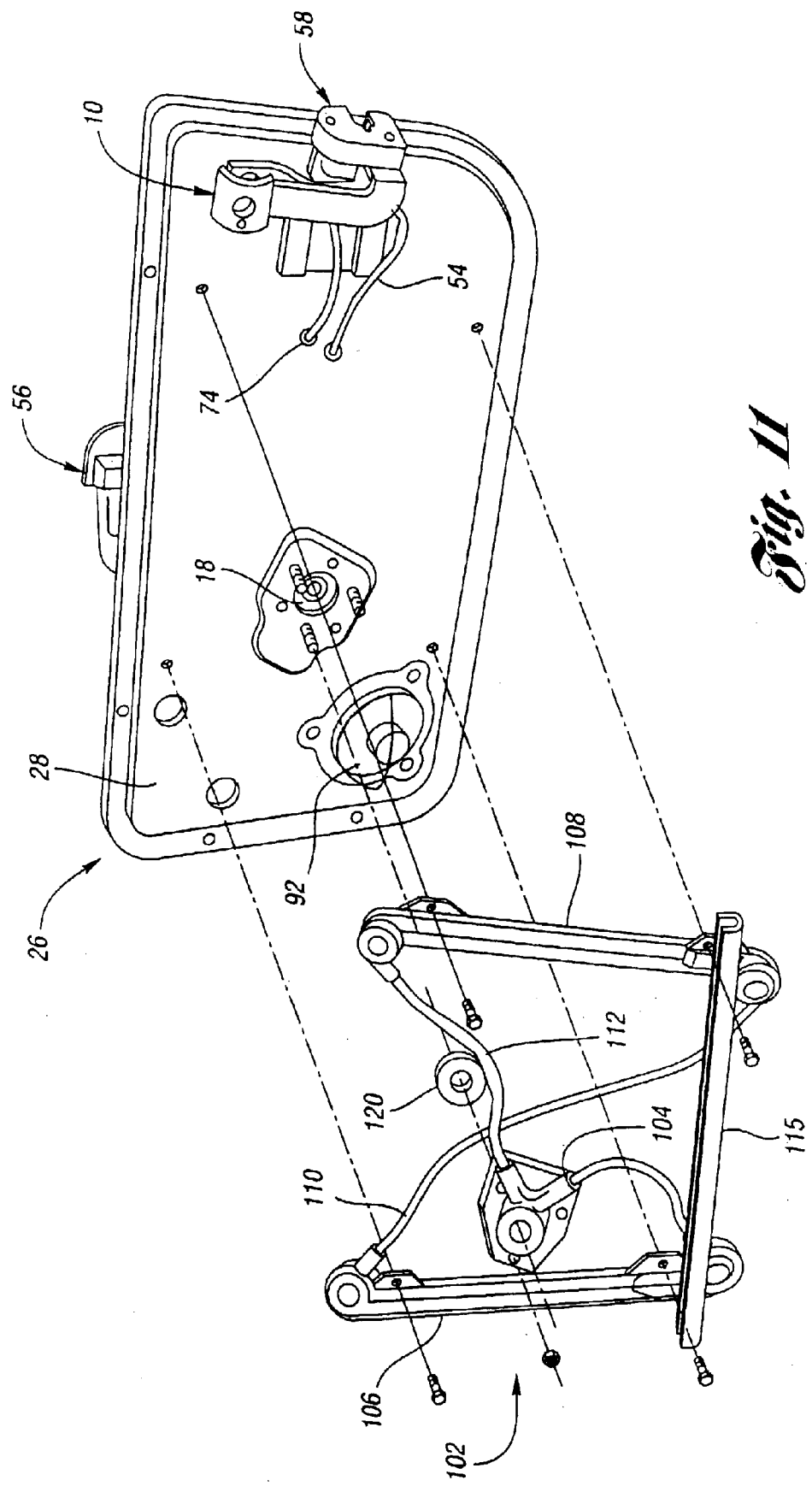
FIG. 11 is an exploded perspective view of a window carrier assembly and carrier of the present invention.

Referring now to FIG. 7, latch assembly 58 includes a latch mechanism (not shown) provided adjacent aperture 68. Latch mechanism receives a striker (not shown) mounted to the frame of the vehicle. Aperture 20 in vehicle door frame 10 is aligned with aperture 68 of latch assembly 58 such that the striker is engaged by latch mechanism of latch assembly 58. Lock assembly 60 includes a lock mechanism 70 operatively connected to cables 52,54.

A description of the assembly of door entry system 36 to carrier 26 is discussed in greater detail. Mounting bracket 66 of the inside door handle 56 is inserted into the mounting bracket 34 on the carrier 26. A fastener is inserted through the mounting bracket 34 to secure the inside door handle 56 in position. In a preferred embodiment of the invention, cables 52, 54 are quick-connect cables having a first end attached to the inside door handle 56 and a second end attached to the latch assembly 60. The second end 72 of the cables 52, 54 includes a grommet 74 extending into apertures 48, 50 to seal the apertures in carrier 26.

Latch assembly 58 includes a plate 78 which extends towards the carrier 26. A pair of rails 80,82 are provided and aligned on the wet side 28 of carrier 26 to receive plate 78 to mount the latch assembly 58 to the carrier 26. The second end 72 of cables extending from latch assembly 58 and lock assembly 60 are connected to the first end 76 of cables extending from the inside door handle 56. The second end of cables 72 are inserted through apertures 48, 50 in the wet side 28 of carrier 26. First and second ends 72, 76 of cables 52, 54 are interconnected to operatively connect the inside door handle 56 to latch assembly 58 and lock assembly 60. Grommets 74 seal apertures 48,50 to keep water and other debris from entering through the dry side of the carrier 26.

Referring now to FIGS. 8 and 9, a speaker assembly 86 is mounted to a dry side 30 of carrier 26. Speaker assembly 86 includes a speaker mounting bracket 88, a speaker 90 mounted to a rear side of speaker bracket 88, and a water shield 92. Water shield 92 is mounted to the rear portion of speaker bracket 88 and extends over speaker 90 and through aperture 32 in carrier 26 to protect the speaker 90 in the door assembly. Speaker assembly 86 is mounted to the carrier 26 by fasteners 94, 96.

Referring now to FIGS. 10–13, modular door assembly for a vehicle includes a window carrier assembly mounted to the carrier 26 of modular door assembly 10. Window carrier assembly includes a window regulator 102 mounted to the carrier 26. Motor 98 is mounted to dry side 30 of carrier 26 by fasteners 100. The motor includes a drive arm (not shown) which extends through carrier 26 to engage a drive section 104 of window regulator 102 disposed on the wet side 28 of carrier 26. Window regulator 102 includes a pair of generally vertical spaced apart rails 106,108 mounted to the wet side 28 of carrier 26. A pair of cables 110,112 extending from drive section 104 are connected to a drive assembly (not shown) in each of rails 106, 108. A window support arm 115 is mounted to the drive assembly in the track section extending through vertical arms 106,108. Cables 110, 112 power arm 115 to raise or lower window pane 117. A pair of mounting brackets 116,118 extend from a lower surface of window pane which be fastened to window arm 115 of window regulator 102. A seal 120 is placed in between motor 98 and corresponding structure 104 to provide a water seal been the wet side and dry side of carrier 26.

Referring now to FIGS. 14–17, a first method for manufacturing and assembling a modular door assembly for a vehicle is described in greater detail. Window carrier assembly 130 includes window pane 132 mounted to carrier 134. A loading device 136 includes a first arm 138 having suction cups 140,142 at each end of the first arm and an adjustable second arm 146 disposed adjacent the first arm 138. Suction cups 140, 142 engage the dry or inner side 144 of carrier 134. The second arm 146 of loading device 136 includes a pneumatically or hydraulically adjustable finger 148 having a suction cup 150 disposed at one end. The adjustable finger 148 extends axially toward the window pane 132 relative to first arm 146 and carrier 134. Suction cup 150 engages the window pane 132 of window carrier assembly 130 through an aperture 15.2 in carrier 134.

Vehicle door 154 frame is placed on a substantially horizontal planar surface for assembly with the window carrier assembly 130. To assemble the vehicle door frame 154 and window carrier assembly 130, an operator manipulates loading device 136 to align and position window carrier assembly 130 substantially parallel to and above door frame 154. Finger 148 of first arm 138 vertically adjusts window pane 132 such that window pane 132 may be inserted through aperture 156 in door frame 154 into track or channel 160 without interfering with the door frame 154.

As shown in FIG. 17, a window assembly tool 159 may be placed around the outer periphery of the upper surface of window pane 132 to protect the window pane during assembly in door frame 154. An operator either manually or operatively adjusts the vertical position of window pane 132 with finger 148 to slide the window pane into position in track 160 and header 162 of vehicle door 154. When the window pane 132 is in position in channel 160 of header section 162, finger 148 disengages suction cup 150 and retracts into first arm 146. The operator then maneuvers the carrier assembly 134 of window carrier assembly 130 into position to fasten the carrier 134 to inner door panel 158, as illustrated by arrow 161 in FIG. 14.

Figure 19:
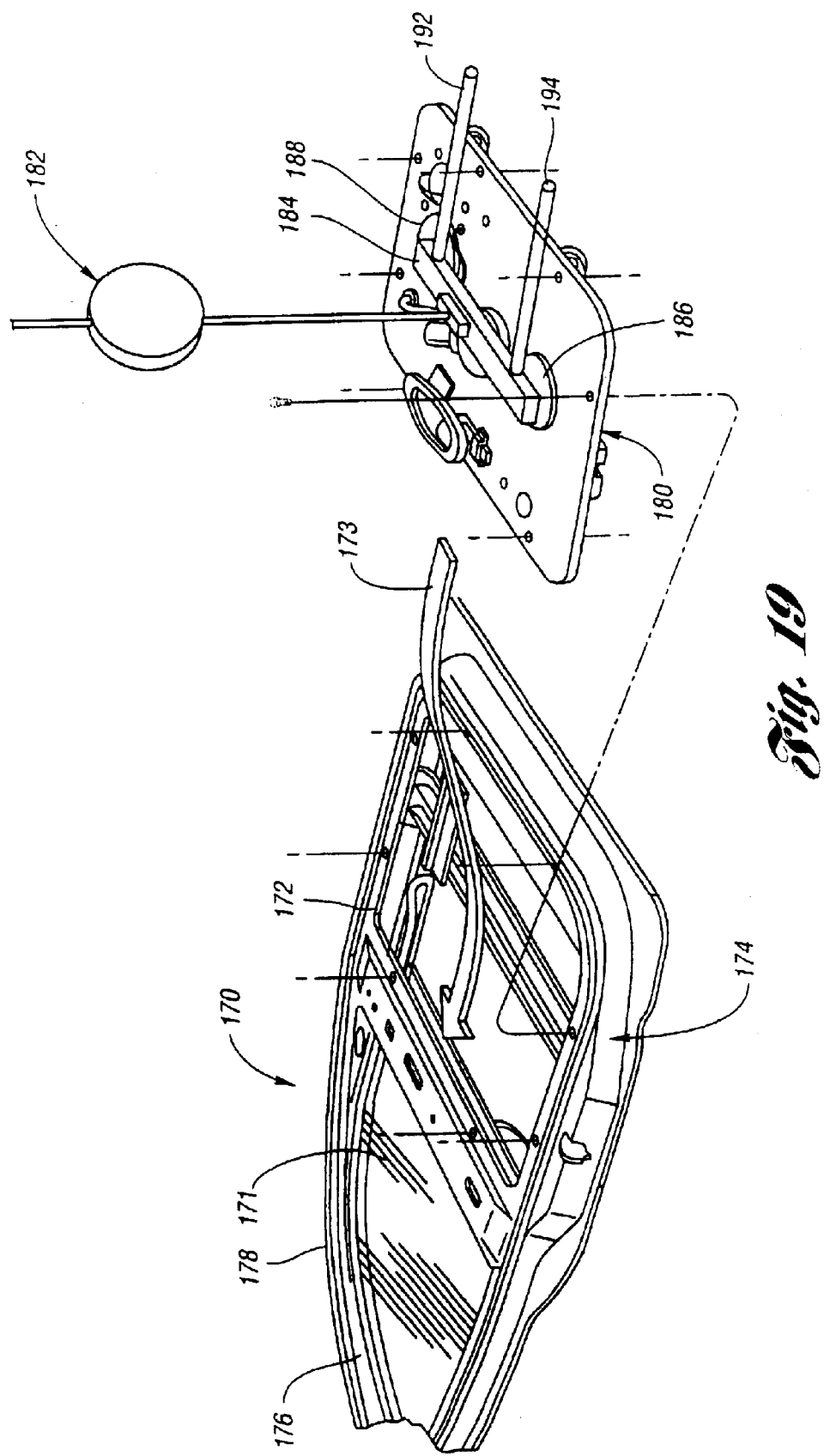
FIG. 19 is an exploded perspective view of the second method of assembling a modular vehicle door panel of the present invention.
Figure 20:
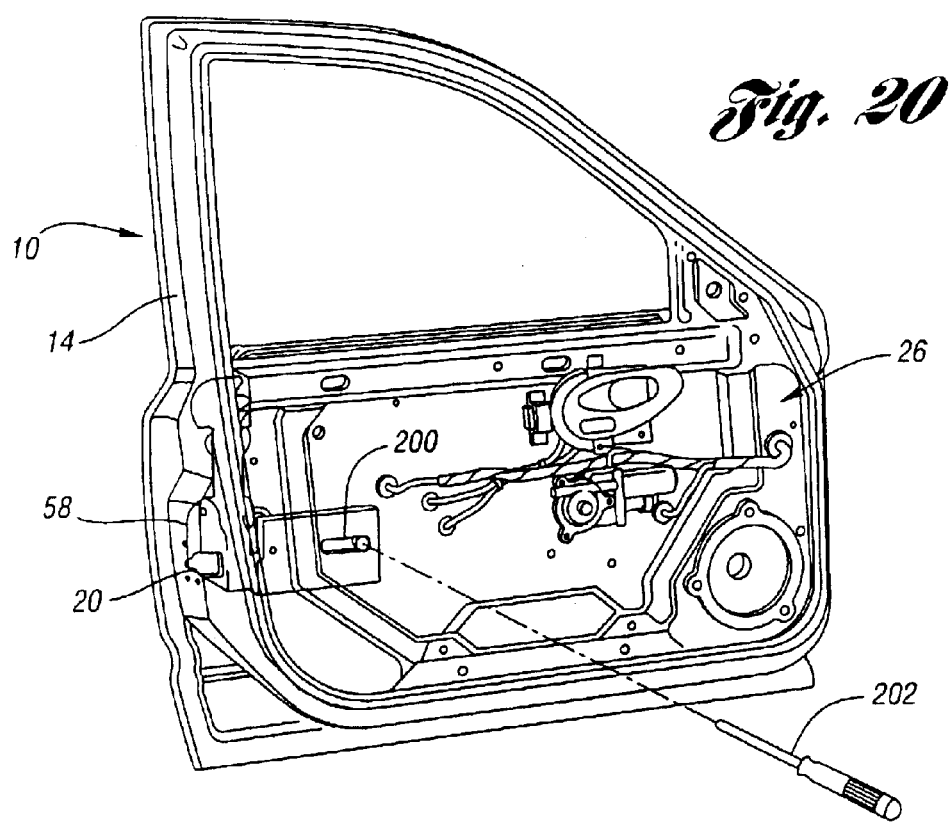
FIG. 20 is a perspective view of the carrier mounted to a door frame of the modular door panel assembly.
Figure 21:
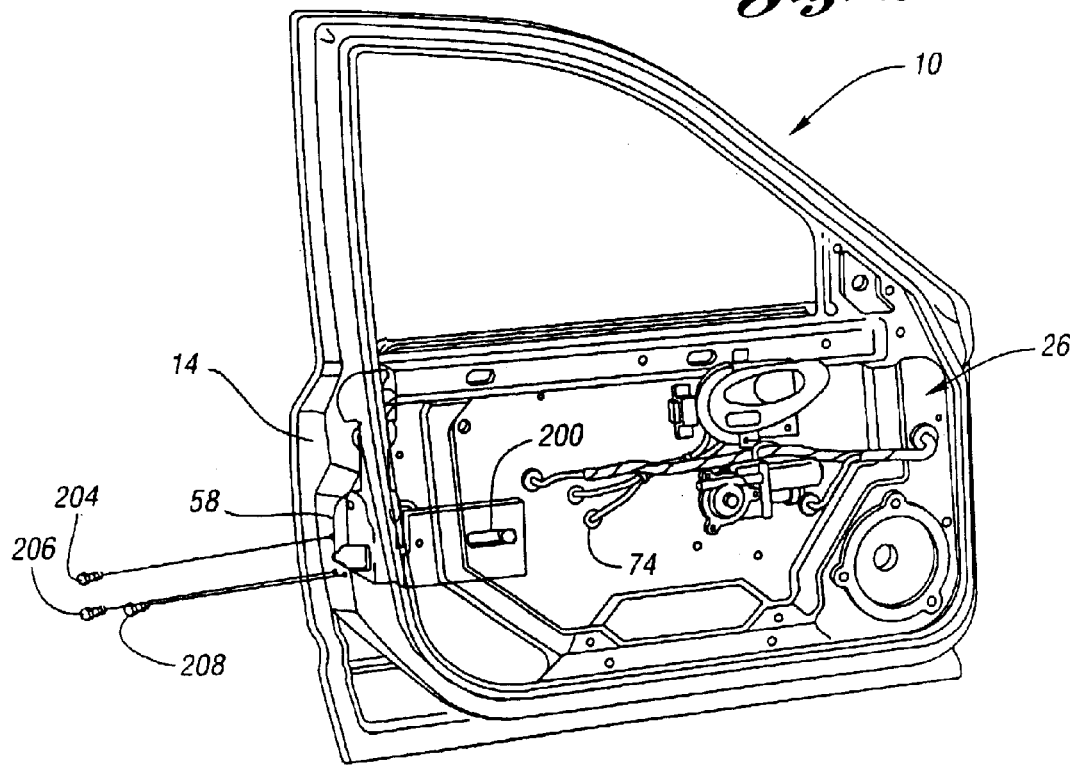
FIG. 21 is a perspective view of the modular door assembly of the present invention.
Figure 22:
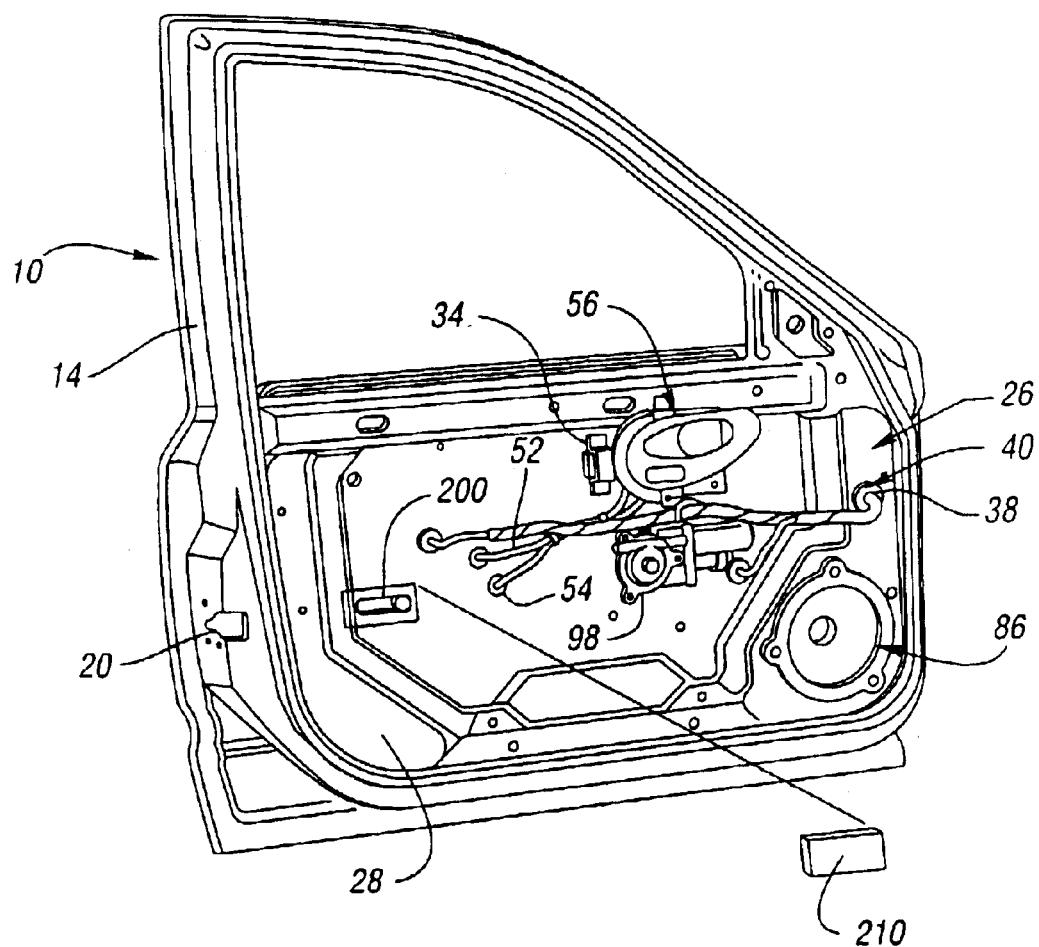
FIG. 22 is an exploded perspective view of a water seal and modular door assembly.

Referring now to FIGS. 18 and 19, a second method for manufacturing and assembling a modular door assembly for a vehicle is disclosed. Vehicle door 170 is placed generally horizontally on a surface to assemble a window carrier assembly thereto. Window pane 171 is inserted into aperture 172 in inner door frame 174 of the vehicle door 170 into track 176 in header section 178 of vehicle door 170. Once aligned in track 176, brackets 175 on the lower surface of window pane 171 are placed in position in door frame which remains in place for assembly with the window carrier assembly 180.

An operator uses lifting and loading device 182 to engage and position window carrier assembly 180 as illustrated by arrow 173 of FIG. 18. Lifting and loading device 182 includes an arm 184 having a pair of suction cups 186,188 spaced at either end of the arm 184. To assemble window carrier assembly 180 to vehicle door 170, an operator uses suction cups 186,188 of machine 182 to engage the dry side 190 of window carrier assembly 180. Arms 192,194 are attached to arm 184 of loading device 182 to position the window carrier assembly 180 parallel to and on inner door panel 174 of vehicle door 170. Once the window carrier assembly 180 is positioned on the inner door panel 174, brackets 175 on window pane 171 are attached to window regulator (not shown) on the wet side of the window carrier assembly 180. Finally, the window carrier assembly is fastened to the inner door panel 174 of vehicle door 170.

Referring now to FIGS. 20–24, an aperture 200 is provided in carrier 26 to allow access to latch assembly 58. A tool 202 is inserted into aperture 200 to move latch assembly 58 toward aperture 20 in vehicle door frame 10. When latch assembly 58 is positioned adjacent to aperture 20 within inner door panel 14 of vehicle door 10, fasteners 204, 206, 208 are inserted through the inner door panel 14 to fasten the latch assembly 58 in position. A water seal 210 is placed over aperture 200 in carrier panel 26 to shield the dry side of carrier 26 from water or other debris entering through the wet side of carrier 26 from vehicle door frame10.

Figure 24:
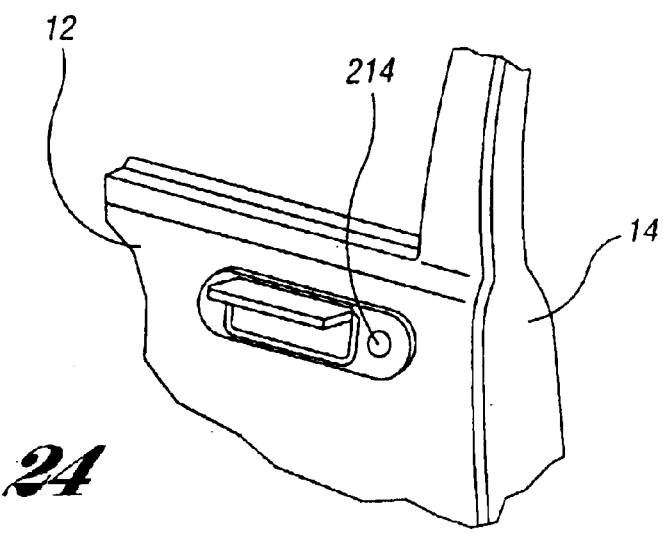
FIG. 24 is a perspective view of the handle assembly mounted to the modular door assembly of the present invention.
Figure 23:
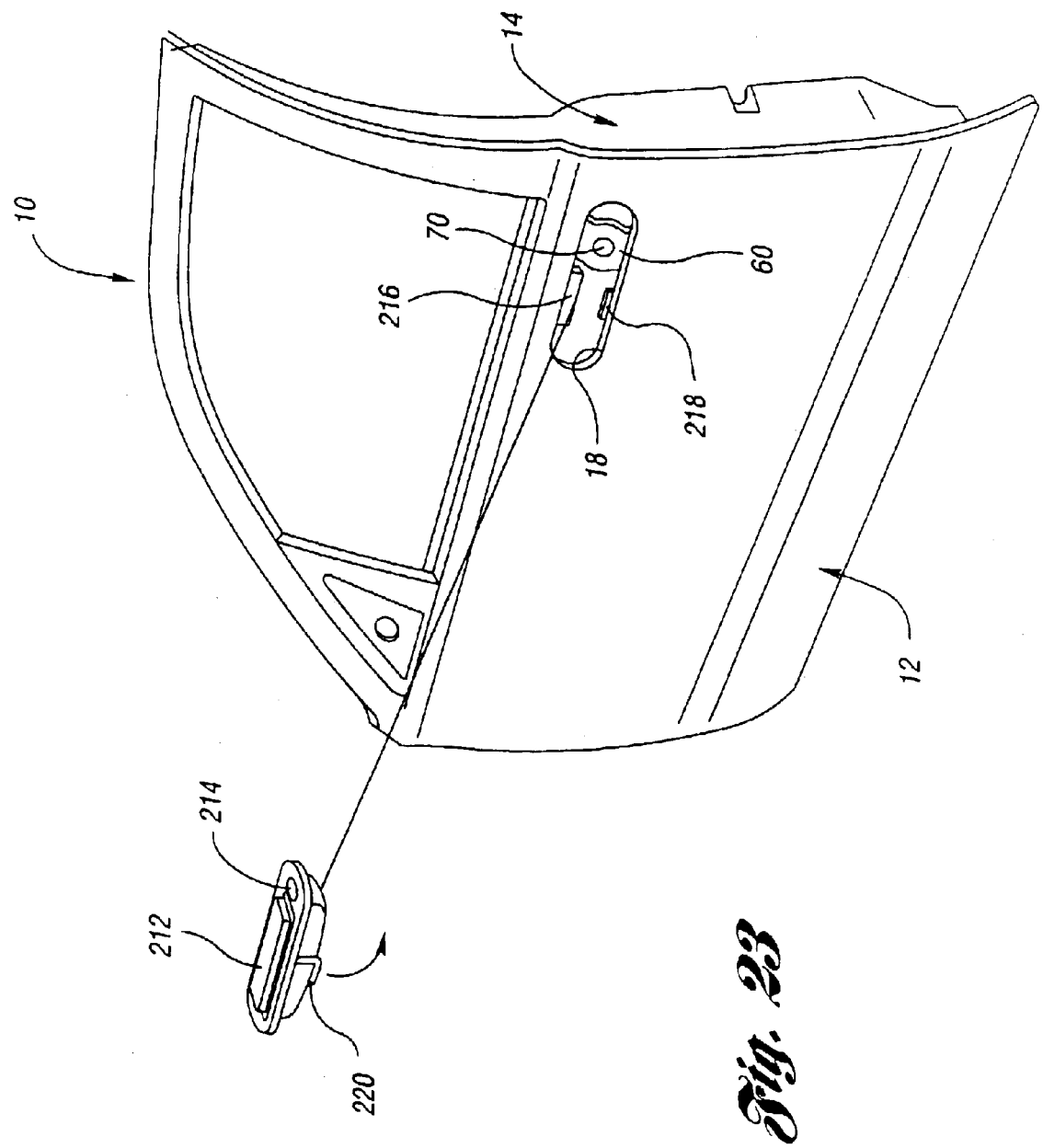
FIG. 23 is an exploded perspective view of an outer door handle and modular door assembly of the present invention.

Referring now to FIGS. 23 and 24, handle 212 is inserted into aperture 18 and outer door panel 12 to complete assembly of the handle and lock assembly 36. Lock assembly 60 is provided adjacent aperture 18 such that lock mechanism 214 and door handle 212 are easily mounted within aperture 70 of lock assembly 60. A set of tabs 216, 218 are provided in aperture 18 to engage tabs 220 on door handle 212. When handle 212 is inserted in aperture 18, tab 220 slides over tab 218 to secure the door handle in position in the vehicle door.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular door assembly for a vehicle comprising:
   a vehicle door frame having an inner surface and an outer surface;
   a carrier having an elongate body secured to the inner surface of the vehicle door frame and providing structural support to the vehicle door frame;
   a seal surrounding an entire outer peripheral edge of the elongate body of the carrier and placed between the door frame and the carrier to inhibit the introduction of foreign materials into a passenger compartment of the vehicle;
   a door entry system mounted on the carrier, the door entry system including a lock assembly, a latch assembly coupled to the lock assembly, at least one cable connecting an inner door handle disposed on the carrier to the latch assembly, and an outer door handle operatively connected to the lock assembly disposed in the outer surface of the vehicle door frame;
   a window carrier assembly mounted on the carrier, the window carrier assembly including a window regulator secured to the carrier and having a pair of vertically extending spaced apart rails, a support arm extending between the rails, and a motor in communication with the support arm to adjust a position of the support arm on the spaced apart rails; and
   a window pane secured to the support arm of the window regulator and is adjustable in a channel in the door frame.

2. The modular door assembly of claim 1 wherein the at least one cable comprises a pair of cables exending through a pair of apertures in the elongate body of the carrier.

3. The modular door assembly of claim 2 wherein grommets extend about the outer periphery of the pair of cables to seal the apertures in the elongate body of the carrier.

4. The modular door assembly of claim 1 wherein the at least one cable includes a first end attached to the inner door handle and a second end attached to the latch assembly.

5. The modular door assembly of claim 1 further comprising vehicle components disposed on the elongate body of the carrier.

6. The modular door assembly of claim 5 wherein the vehicle components include a speaker assembly mounted in an aperture formed in the elongate body of the carrier and switches which operatively control the door entry system.

7. The modular door assembly of claim 1 further comprising a wiring harness assembly extending through an aperture in the elongate body of the carrier to connect the motor of window carrier assembly to an electrical system of the vehicle.

8. A module configurable for securement to a vehicle door assembly of a vehicle, the module comprising:
   a carrier formed of an elongate body having an outer surface and an inner surface;
   a seal mounted on and surrounding an entire outer peripheral edge of the elongate body of the carrier to inhibit the introduction of foreign materials into a passenger compartment of the vehicle;

a door entry system mounted to the carrier, the door entry system including a latch assembly mounted adjacent a rear portion of the elongate body, a lock assembly coupled to the latch assembly adjacent the outer surface of the carrier, an outer door handle operatively connected to the lock assembly, an inner door handle secured to the inner surface of the carrier, and at least one cable extending through at least one aperture in the elongate body of the carrier to operatively connect the inner door handle and the latch assembly;

a window carrier assembly mounted to the elongate body of the carrier, the window carrier assembly including a window regulator having a pair of spaced apart generally vertical rails mounted to the outer surface of the carrier, a generally horizontal support arm extending between the rails, and a motor operatively connected to the support arm;

vehicle components mounted to the carrier and extending toward the passenger compartment of the vehicle;

a wiring harness assembly extending through apertures in the elongate body of the carrier to connect the motor of window carrier assembly and the vehicle components to an electrical system of the vehicle; and a window pane vertically adjustable relative to the elongate body of the carrier mounted to the generally horizontal support arm of the window carrier assembly.

9. The module of claim 8 wherein a grommet extends about the outer periphery of the at least one cable operatively connecting the inner door handle and the latch assembly to seal the at least one aperture in the elongate body of the carrier.

10. The module of claim 8 wherein the at least one cable includes a first end attached to the inner door handle, a second end attached to the latch assembly and a grommet extending into the at least one aperture to seal the at least one aperture in the carrier.

11. The module of claim 8 wherein a grommet extends about the outer periphery of the wiring harness assembly to seal at least one of the apertures in the elongate body of the carrier through which said wiring harness assembly extends.

12. The module of claim 8 wherein the vehicle components include a speaker assembly mounted in an aperture formed in the elongate body of the carrier and switches which operatively control the door entry system.

13. The module of claim 8 wherein the elongate body of the carrier is a one-piece stamped metal structure.

14. The module of claim 8 wherein the elongate body of the carrier is formed from a polymeric material as a one-piece structure.

* * * * *